United States Patent
Broers et al.

(10) Patent No.: US 11,284,011 B2
(45) Date of Patent: Mar. 22, 2022

(54) DETECTING CODED LIGHT WITH ROLLING-SHUTTER CAMERAS

(71) Applicant: SIGNIFY HOLDING B.V., Eindhoven (NL)

(72) Inventors: Harry Broers, Eindhoven (NL); Stephanus Joseph Johannes Nijssen, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 183 days.

(21) Appl. No.: 16/646,099

(22) PCT Filed: Sep. 5, 2018

(86) PCT No.: PCT/EP2018/073826
§ 371 (c)(1),
(2) Date: Mar. 10, 2020

(87) PCT Pub. No.: WO2019/048457
PCT Pub. Date: Mar. 14, 2019

(65) Prior Publication Data
US 2020/0213498 A1 Jul. 2, 2020

(30) Foreign Application Priority Data
Sep. 11, 2017 (EP) .................................... 17190417

(51) Int. Cl.
*H04N 5/235* (2006.01)
*H04B 10/116* (2013.01)
*H04N 5/247* (2006.01)

(52) U.S. Cl.
CPC ......... *H04N 5/2352* (2013.01); *H04B 10/116* (2013.01); *H04N 5/247* (2013.01)

(58) Field of Classification Search
CPC ......... H04N 5/23206; H04N 5/232933; H04N 5/2352; H04N 5/247; H04N 5/23254; H04N 5/2353; H04N 5/3532; H04N 3/1506; H04B 10/11; H04B 10/1143; H04B 10/116; H04B 10/541; H04L 12/2803; H04L 2012/2841; H04W 4/50; H04W 4/20
See application file for complete search history.

(56) References Cited

U.S. PATENT DOCUMENTS 9,240,049 B2   1/2016   Ciurea et al.
9,491,380 B2   11/2016  Cami et al.
(Continued)

FOREIGN PATENT DOCUMENTS

JP   2007201681 A  *  8/2007
WO  2015104187 A1    7/2015
(Continued)

*Primary Examiner* — Nelson D. Hernández Hernández

(57) ABSTRACT

A method, program and apparatus for detecting a repeating coded light message embedded in light emitted by a light source, based on images captured from rolling-shutter cameras which capture their frame areas line-but-line. Images of the light source are captured simultaneously using a plurality of different rolling-shutter cameras having different acquisition regimes in order to improve the robustness and/or speed of coded light detection. The different acquisition regimes may comprise different frame rates, different physical orientations, or different line-readout directions.

15 Claims, 8 Drawing Sheets

(56) References Cited

U.S. PATENT DOCUMENTS

2015/0350555 A1 12/2015 Nishi
2016/0359560 A1 12/2016 Baggen et al.

FOREIGN PATENT DOCUMENTS

| WO | WO-2015104187 A1 * | 7/2015 | ........... H04N 13/254 |
| WO | 2015121155 A1 | 8/2015 | |
| WO | 2017055119 A1 | 4/2017 | |

* cited by examiner

DETECTING CODED LIGHT WITH ROLLING-SHUTTER CAMERAS

CROSS-REFERENCE TO PRIOR APPLICATIONS

This application is the U.S. National Phase application under 35 U.S.C. § 371 of International Application No. PCT/EP2018/073826, filed on Sep. 5, 2018, which claims the benefit of European Patent Application No. 17190417.0, filed on Sep. 11, 2017. These applications are hereby incorporated by reference herein.

TECHNICAL FIELD

The present disclosure relates to the detection of a signal embedded in light using a rolling-shutter camera whereby each frame is exposed line-by-line.

BACKGROUND

Coded light refers to techniques whereby information is communicated in the form of a signal embedded in the visible light emitted by a light source. Coded is sometimes also referred to as visible light communication (VLC). The signal is embedded by modulating a property of the visible light, typically the intensity, according to any of a variety of suitable modulation techniques. For instance this enables a sequence of data symbols to be modulated into the light emitted by a light source. Based on the modulations, the information embedded in the light can be detected using any suitable light sensor. This can be either a dedicated photocell (point detector), or a camera comprising an array of photocells (pixels) and a lens for forming an image on the array. E.g. the sensor may be a dedicated photocell included in a dongle which plugs into a mobile user device such as a smartphone, tablet or laptop; or the sensor may be a general purpose camera integrated into the mobile user device. Either way this may enable an application running on the user device to receive an ID code or even other, more complex data via the light.

VLC is often used to embed a signal in the light emitted by an illumination source such as an everyday luminaire, e.g. room lighting or outdoor lighting, thus allowing the illumination from the luminaires to double as a carrier of information. The light thus comprises both a visible illumination contribution for illuminating a target environment such as room (typically the primary purpose of the light), and an embedded signal for providing information into the environment (typically considered a secondary function of the light). In such cases, the modulation is typically performed at a high enough frequency so as to be beyond human perception, or, if any lower frequency components are present, at least such that any visible temporal light artefacts (e.g. flicker and/or strobe artefacts) are weak enough not to be noticeable or at least to be tolerable to humans. Thus the embedded signal does not affect the primary illumination function, i.e. so the user only perceives the overall illumination and not the effect of the data being modulated into that illumination. This is typically achieved by choosing a DC free code or modulation scheme, wherein the power spectral density goes to zero at zero Hertz, with very little spectral content at low frequencies (relative to the overall DC light intensity level; i.e. the symbols are modulated as positive and negative fluctuations relative to a non-zero DC offset corresponding to the overall visible illumination intensity, but the code or modulation scheme in itself is DC free relative to this level). Thus visible flicker is reduced to a practically invisible level.

One way to detect coded light is using an everyday 'rolling shutter' type camera, as is often integrated into a mobile device like a mobile phone or tablet. In a rolling-shutter camera, the camera's image capture element is divided into a plurality of lines (typically horizontal lines, i.e. rows) which are exposed in sequence line-by-line. That is, to capture a given frame, first one line is exposed to the light in the target environment, then the next line in the sequence is exposed at a slightly later time, and so forth. Typically the sequence 'rolls' in order across the frame, e.g. in rows top to bottom, hence the name 'rolling shutter'. When used to capture coded light, this means different lines within a frame capture the light at different times and therefore, if the line rate is high enough relative to the modulation frequency, at different phases of the modulation waveform. Thus the modulation in the light can be detected. Coded light can also be detected by using a global shutter camera if the frame rate is high enough relative to the modulation frequency, or using a dedicated photocell with suitable sample rate.

Coded can be used for a number of applications. For example, the data embedded in the illumination emitted by a light source may comprise an identifier identifying that light source. This identifier can then be detected by a remote control unit, and used to identify the light source in order to control it remotely via a back channel such as an RF back channel. E.g. the remote control unit may take the form of a smartphone or tablet running a remote control application (or "app"), in which case the light sensor may be the built-in camera of the device. The app detects the identifier using the camera, and then uses this to address the light source via an RF access technology such as Wi-Fi, ZigBee or Bluetooth.

In another example, the identifier can be used for navigation, or to provide other location-based information or functionality. This is achieved by providing a mapping between the identifier of the light source and a known location of the light source, and/or other information associated with the location. In this case a device such as a mobile phone or tablet which receives the light (e.g. through a built-in camera) can detect the embedded identifier and use it to look up the corresponding location and/or other information mapped to the identifier (e.g. in a location database accessed over a network such as the Internet). The purpose of looking up the location of the device could be to help the user of the device navigate, e.g. to find his or her way throughout a large building or complex such as a hospital; and/or to determine whether the device is entitled to access some location-based service such as the ability to control the lighting in a particular room. Or in the case of mapping other information to the identifier, this could be used to look up information relevant to the location in which the light source is deployed, such as to look up information about a museum exhibit in a certain room or zone of the museum.

In yet further applications, information other than just an identifier can be directly encoded into the light (as opposed to being looked up based on an ID embedded in the light). Thus coded light can be used as an alternative (or supplement) to radio-based means of broadcasting any arbitrary data content that might be desired for the application in question.

Typically the ID or data emitted by the light source is emitted in the form of a cyclically repeating message, having a periodic message duration. The message duration may be longer than the length of time to expose one frame. Hence in the decoding, multiple fractional message portions captured from different successive frames may need to be stitched together to reconstruct the message. Techniques for reconstructing ("stitching") a message from such message fragments are known in the art, and are described in WO2015/121155. Furthermore, WO2015/104187 discloses an array of cooperating cameras for decreasing decoding time.

SUMMARY

One issue with detecting coded light using a rolling-shutter camera is that the speed of detection can be hampered by certain circumstances. For one, the footprint of the light source in the image is often only a small fraction of the frame area, meaning that only a few lines in each frame capture the coded information signal. This means many frames will be needed before the complete message is captured in full. Further, for fast detection the combination of the camera and the light source should exhibit good "rolling" behaviour. If the frame rate of the camera is equal to or close to the message repetition rate of the coded light signal, then each frame will always see the same portion of the message whilst other portions will go unseen. Or in other words the message does not "roll". A similar effect occurs for other highly rational relationships between frame rate and message rate, e.g. when the frame rate is an integer multiple of the message rate and the footprint is small. Consider for example the frame rate being twice the message repetition rate, with only a small footprint of the light source being captured. In this case alternate frames repeatedly capture only the same pair of message portions whilst other portions go unseen. Whereas if, say, there is no particular mathematical relationship between the frame rate and the message duration, then each frame will capture a substantially different portion of the message and the whole message will be captured over a relatively small number of frames. This behaviour is referred to as "rolling".

It would be desirable to avoid situations where a large number of frames need to be collected before a complete message is acquired; for example where the camera only ever sees a small, repeating fraction of the message, or where rolling is slow such that it takes a large number of frames to reveal the whole message.

The present disclosure provides an arrangement which uses multiple cameras for VLC detection, wherein the multiple cameras simultaneously capture images of the same light source but different ones of the cameras are configured with a different respective acquisition regimes in order to increase the robustness and/or speed of VLC detection (compared with detection by a single camera or multiple cameras with identical acquisition regimes).

According to one aspect disclosed herein, there is provided a method of detecting a repeating coded light message embedded in light emitted by a light source, the method comprising: from each respective one of a plurality of rolling-shutter cameras, receiving a respective series of frames captured by the respective camera, wherein the frames of each series each capture a footprint of the light source, and each frame in the series captures only a portion of the message, and wherein each of the cameras has a different value of a property affecting a number of frames required to capture the whole message; determining which of the cameras has the value of said property requiring the fewest number of frames to capture the whole message; and based thereon, selecting to decode the message by combining portions of the message captured from the determined camera.

Said each respective one of a plurality of rolling-shutter cameras may be comprising at least one first camera and at least one second camera. Hence, each respective one of a plurality of rolling-shutter cameras may be phrased accordingly to comprising such at least one first camera and at least one second camera.

In embodiments, said property may comprise a frame rate at which the respective series is captured.

This has the effect that different speeds of message rolling will be experience by the two or more different cameras. Hence even if one of the cameras in question happens to have a frame rate that, for a given message repetition period, happens to exhibit non-rolling behaviour or only very slowly rolling behaviour (e.g. each frame sees the same or nearly the same fragment whilst other fragments are continually missed); then the other camera with the different frame rate may exhibit better rolling behaviour, and so the frames captured by this camera can be selected to perform the decoding.

In some embodiments the frame rates of both or all the cameras may be fixed—many existing cameras have a frame rate that cannot be varied by a third-party application such as a coded light decoding application. In such cases the invention nonetheless exploits the fact that some cameras might happen to have different frame rates.

In some other cases, the frame rate of at least one camera may be settable, e.g. by a coded light decoding application via an API to the camera. In such cases, the method may comprise comprising varying the frame rate of a first one or more of the cameras to search for a value of the frame rate which reduces the number of frames to capture the message.

Preferably the method comprises leaving the frame rate of at least a second, other one or more of the cameras constant while varying the frame rate of the one or more first cameras to search for a value that reduces the number of frames required to capture the whole message compared to the constant frame rate or rates of the one or more second cameras.

Said at least a second, other one or more of the cameras may be phrased here as the at least one second camera. Said one or more first cameras may be phrased here as the at least one first camera.

So for one first and one second camera, said selection comprises: (a) if enough of said portions to obtain the whole message are captured using the second camera with the constant frame rate before the whole message can be captured using the first camera by search with the varied rate, then selecting to perform said combining and decoding using the portions captured by the second camera; but (b) if a new value of the frame rate of the first camera is found during said search enabling enough of said portions to obtain the whole message to be captured using the first camera before the second camera, then selecting to perform said combining and decoding using the portions captured by the first camera at said new frame rate.

Or more generally for one or more first cameras with frame rates varied during the search and one or more second cameras with frame rates kept constant during the search, said selection may comprise: (a) if enough of said portions to obtain the whole message are captured using at least one of the one or more second cameras with the constant frame rate before the whole message can be captured using any of the one or more first cameras by the varying of their frame rate, then selecting to perform said combining and decoding using the portions captured by said at least one of the second cameras; but (b) if a new value of the frame rate of at least one of the one or more first cameras is found during said search enabling enough of said portions to obtain the whole message to be captured using said one of the first cameras before any of the one or more second cameras, then selecting to perform said combining and decoding using the portions captured by said at least one of the first cameras at the new frame rate.

In alternative or additional embodiments, said property may comprise an orientation of a line readout direction of the rolling-shutter capture, the line readout direction of the cameras being non-parallel with respect to one another. This may be achieved by means of the physical orientation of the camera or its image sensor, or even by arranging one camera to capture its images row-by-row (top-to-bottom or bottom-to-top with respect to the frame area) while the other captures its image column-by-column (left-to-right or right-to-left). In embodiments the cameras face in the same direction (parallel optical axes, and the same or parallel image planes). In this case the cameras may be arranged such that their line readout directions are non-parallel in a plane of the image sensors, preferably at 90 degrees to one another.

These embodiments have the effect that, unless the footprint of the camera has complete (continuous) rotational symmetry in the image plane of the frames, then the footprint in the frame area of one camera will cover more rolling-shutter lines than for another of the cameras. Hence even if the frame rates are the same, and so the speed at which the message rolls is the same for both cameras, one of the cameras will nonetheless experience larger message fragments than the other. So for a given rate of message rolling, the camera capturing larger fragments will be able to capture the complete message in fewer frames.

In alternative or additional embodiments, said cameras comprise at least a pair of cameras (12i, 12ii); and wherein said property comprises a rolling-shutter line-readout direction; and wherein one of the pair of cameras performs its respective capture with a rolling-shutter line-readout direction in the opposite direction to the other of the pair of cameras.

The advantage of such arrangements is that, as long as the footprint of the light source does not happen to span a symmetrical number of rolling-shutter lines either side of the temporal mid-point of the frame period, then in each frame period the two different cameras will capture the light source (and hence the message) at two different times. Say for the sake of illustration that the light source's footprint is toward the top of the frame area, and a first camera reads out top-to-bottom while a second camera reads out bottom-to-top. Thus the first camera will capture the light source at an earlier time within the frame period, and the second camera will capture the light source at a later time. This means the two cameras will capture the message from the light source at different phase, thus obtaining two different fragments per message period instead of just one. Such an asynchrony may cause a difference in said number of frames required to capture the whole message. Hence, subsequently, in such an embodiment, the cameras requiring the fewest number of frames to capture the whole message may be determined; and based thereon selected to decode the message by combining portions of the message captured from said determined camera. In embodiments, here, the line-readout directions may be parallel with one another. For example, the line-readout directions may both be 'horizontal' (hence parallel with one another) but reading out in opposite directions.

In embodiments said determination may be performed by observing the time taken to capture the whole message. Alternatively said determination is performed by observing a degree of overlap between fragments prior to receipt of the whole message. Alternatively said determination may be performed analytically (i.e. a priori, not based on empirical observations of the timing or size of the received fragments). This could be by means of a theoretical formula, or by means of a look-up based on a past simulation.

Where the determination of the fastest camera is completed after a full message worth's of fragments have been collected, such as in the case where the determination is performed by monitoring for which camera is first to collect enough fragments to obtain a whole message, then said selection and decoding may comprise either (a) selecting to decode the message from the already-captured fragments captured by the determined camera, (b) selecting to decode from future fragments captured by that camera, or (c) a selecting to decode from a combination of already-received and future fragments captured by the camera in question. In the case where the fastest camera is determined based on a degree of overlap between fragments, or analytically without reference to observations of received fragments, then this allows the fastest camera to be selected before a complete message worth's of fragments have been collected from any of the cameras. In such cases, said selection and decoding may comprise selecting to decode from future fragments captured by the determined camera, or selecting to decode from a combination of already-received and future fragments captured by that camera.

According to another aspect disclosed herein, there may be provided a method of detecting a repeating coded light message embedded in light emitted by a light source, the method comprising: from each respective one of a plurality of rolling-shutter cameras, receiving a respective series of frames captured by the respective camera at a respective frame rate, wherein the frames of each series each capture a footprint of the light source, and each frame in the series captures only a portion of the message; and varying the frame rate of a first one or more of the cameras to search a value of the frame rate which reduces the number of frames to capture the message; and decoding the message by combining portions of the message captured by at least one of the cameras.

In embodiments, the method comprises leaving the frame rate of a second, other one or more of the cameras constant while varying the frame rate of the one or more first cameras to search for a value that reduces the number of frames required to capture the whole message compared to the frame rate of the one or more second cameras alone.

The combining may comprise combining portions from at least the camera that captures the whole message in the fewest frames. The method may comprise selecting to perform said combining using at least the fragments from whichever camera or subset of cameras received the full message first (i.e. earliest, as disclosed above). The combining may be performed using message portions from only the camera that (by itself) obtained the whole message first (earliest), or only a subset of those that obtained it first. Alternatively, the combining may comprise combining portions from multiple of the cameras, potentially including both (i) at least one of the first cameras based on a frame rate or rates resulting from the search and (ii) at least one of the second cameras based on its/their constant frame rate(s).

According to another aspect disclosed herein, there is provided a method of detecting a repeating coded light message embedded in light emitted by a light source, the method comprising: from each respective one of a pair of rolling-shutter cameras, receiving a respective series of frames captured by the respective camera, wherein the frames of each series each capture a footprint of the light source, and each frame in the series captures only a portion of the message, and wherein one of the pair of cameras performs its respective capture with a rolling-shutter line-readout direction in the opposite direction to the other of the pair of cameras; and decoding the message by combining portions of the message captured from both of the pair cameras using the different line read-out directions.

I.e., assuming a frame of reference where "top" and "bottom" are defined relative to the line read-out, one of the cameras performs its rolling-shutter capture from top-to-bottom of the frame area, while the other performs its capture bottom-to-top of the frame area. In embodiments the frame areas of the two cameras are, aside from the line readout direction, otherwise arranged in the same orientation. In embodiments the frame period for one camera is aligned in time with that of the other camera, i.e. the capture of each frame in one read-out direction by the first camera starts at the same time as the capture of a corresponding frame in the other read-out direction by the other camera. In embodiments the read-out direction of one or both may be settings controlled to be opposite. Alternatively the readout directions could be inherent, fixed properties.

The advantage of such arrangements is that, as long as the footprint of the light source does not happen to span a symmetrical number of rolling-shutter lines either side of the temporal mid-point of the frame period, then in each frame period the two different cameras will capture the light source (and hence the message) at two different times. Say for the sake of illustration that the light source's footprint is toward the top of the frame area, and a first camera reads out top-to-bottom while a second camera reads out bottom-to-top. Thus the first camera will capture the light source at an earlier time within the frame period, and the second camera will capture the light source at a later time. This means the two cameras will capture the message from the light source at different phase, thus obtaining two different fragments per message period instead of just one. Given also knowledge of the relative timing of the different fragments, the various fragments from both cameras can then be reassembled ("stitched") using message fragment stitching techniques which, in themselves, are known in the art.

In embodiments of said another aspect of the invention, in addition to the different line-readout directions, one of the cameras may capture its respective series of frames at a different frame rates compared to the other camera. This has the effect that different speeds of message rolling will be experience by the two or more different cameras. Hence even if one of the cameras in question happens to have a frame rate that, for a given message repetition period, happens to exhibit non-rolling behaviour or only very slowly rolling behaviour, then the other camera with the different frame rate may exhibit better rolling behaviour.

Further, in embodiments, the line-readout directions of the pair of cameras may be arranged in parallel with one another (i.e. 180 degrees). This has the advantage of maximising the time different between the message portions sampled by the two different cameras.

Further, alternatively, in addition to the different line-readout directions, one of the cameras or an image sensor thereof may be physically oriented such that its line readout direction is non-parallel with respect to that of the other camera (i.e. an angle substantially inbetween, but not equal to, 0 and 180 degrees). This has the advantage that, unless the footprint of the camera has complete (continuous) rotational symmetry in the image plane of the frames, then the footprint in the frame area of one camera will cover more rolling-shutter lines than for the other camera. Hence one of the cameras will capture larger message fragments than the other, so the camera capturing larger fragments will be able to capture the complete message in fewer frames.

According to yet another aspect disclosed herein, there may be provided a method of detecting a repeating coded light message embedded in light emitted by a light source, the method comprising: from each respective one of a plurality of rolling-shutter cameras, receiving a respective series of frames captured by the respective camera, wherein the frames of each series each capture a footprint of the light source, and each frame in the series captures only a portion of the message, and wherein each of the cameras has a different value of a property affecting a power consumption required to capture the whole message; determining which of the cameras has the value of said property requiring the fewest power consumption to capture the whole message; and based thereon, selecting to decode the message by combining portions of the message captured from the determined camera.

In embodiments, partly analogue to the embodiments of the first aspect of the invention above, said property may comprise a frame rate and/or processing power and/or line-readout direction at which the respective series is captured. Furthermore, the method may comprise comprising varying the frame rate of a first one or more of the cameras to search for a value of the frame rate and/or processing power and/or line-readout direction which reduces the power consumption to capture the message.

Preferably the method comprises leaving the frame rate and/or processing power and/or line-readout direction of at least a second, other one or more of the cameras constant while varying the frame rate and/or processing power and/or line-readout direction of the one or more first cameras to search for a value that reduces the power consumption required to capture the whole message compared to the constant frame rate and/or processing power and/or line-readout direction of the one or more second cameras.

The advantage of the yet another aspect of the invention, as described above, is that detecting a repeating coded light message embedded in light emitted by a light source may be more energy efficient. Namely, a camera is selected with a value of a property which consumes the least power or energy for capturing the whole message.

In any of the aspects or embodiments disclosed herein, the light in which the coded light message is embedded may comprise visible illumination.

Said cameras may comprise at least a pair of cameras housed in a same user device.

For instance the pair of cameras may form a stereoscopic camera arrangement.

The user device may take the form of a mobile user terminal such as a laptop, tablet smartphone, or wearable device.

The disclosed steps may be performed by a coded light decoding application arranged to run on a server and/or user terminal, e.g. the user terminal in which one, some or all of the cameras are housed.

According to another aspect disclosed herein, there is provided a computer program product comprising code embodied on computer-readable storage, the code being configured so as when run on one or more processing units to perform operations in accordance with any of the embodiments disclosed herein.

According to another aspect disclosed herein, there is provided signal processing apparatus comprising a decoder configured to perform operations in accordance with any of the embodiments disclosed herein.

According to another aspect disclosed herein, there is provided a receiver subsystem comprising said signal processing apparatus and the cameras.

According to another aspect disclosed herein, there is provided a communication system comprising the receiver subsystem and the light source. Said communication system may be an indoor positioning system based on VLC.

In alternative or additional embodiments of the aspects of the invention disclosed herein, said property affecting the number of frames required to capture the whole message may be an exposure time of the respective camera. Namely: exposure time of a camera may affect the detection of VLC, since underexposure typically renders a darkened image in which only the bright areas are more distinct. Thus, a footprint of a light source emitting a modulated light signal may be detected more accurately in some examples, and the modulated light signal may be received more effectively in some examples. Hence, in such situations, the property of exposure time of a respective camera may render a detection of a whole message with a fewer number of frames.

Similarly, in yet an alternative or additional embodiment, said property affecting the number of frames required to capture the whole message may be an ISO value, because ISO value may also influence the effectiveness of detecting VLC.

Similarly, in yet an alternative or additional embodiment, said property affecting the number of frames required to capture the whole message may be a resolution of the respective camera; because the footprint of some light sources, which are emitting a modulated light signal, may be detected more effectively with a lower resolution, since a higher resolution slows down VLC detection due to the increase processing time (and increased depletion of battery power). However, in other situations, said resolution cannot be lowered, or a higher resolution is required to capture the light source in more detail. Thus, in some situations, the property being resolution may render a detection of a whole message with a fewer number of frames, and/or with an improved power/energy consumption.

Similarly, in yet an alternative or additional embodiment, said property affecting the number of frames required to capture the whole message may be a zoom or focus of the respective camera; or alternatively the region of interests (when e.g. having a region of interest camera).

Similarly said property affecting a power consumption required to capture the whole message may mutatis mutandis be exposure time, resolution, ISO value, region of interest, or zoom or focus.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

The following describes a method to improve the detection of Visible Light Communication (VLC)—i.e. coded light—by using multiple cameras capturing the same light source at once. By having different image acquisition regimes per camera, the robustness of VLC and detection speed (bandwidth of the channel) can be improved significantly.

Figure 1:
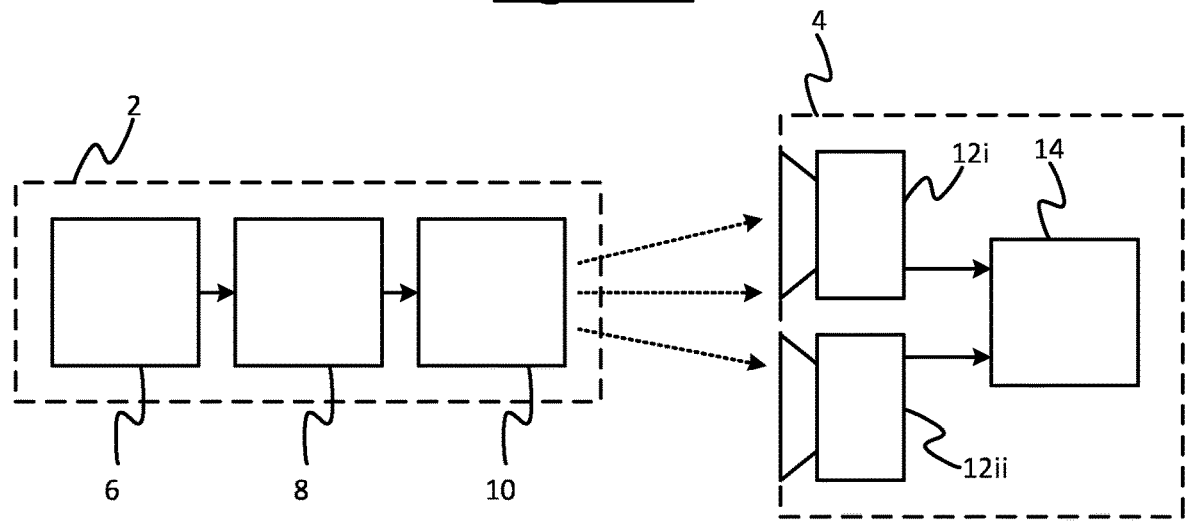
FIG. 1 is a schematic block diagram of a coded light communication system.

FIG. 1 gives a schematic overview of a system for transmitting and receiving coded light. The system comprises a transmitter 2 and a receiver 4. For example the transmitter 2 may take the form of a luminaire, e.g. mounted on the ceiling or wall of a room, or taking the form of a free-standing lamp, or an outdoor light pole. The receiver 4 may for example take the form of a mobile user terminal such as a smart phone, tablet, laptop computer, smartwatch, or a pair of smart-glasses.

The transmitter 2 comprises a light source 10 and a driver 8 connected to the light source 10. In the case where the transmitter 2 comprises a luminaire, the light source 10 takes the form of an illumination source (i.e. lamp) configured to emit illumination on a scale suitable for illuminating an environment such as a room or outdoor space, in order to allow people to see objects and/or obstacles within the environment and/or find their way about. The illumination source 10 may take any suitable form such as an LED-based lamp comprising a string or array of LEDs, or potentially another form such as a filament bulb or fluorescent lamp. The transmitter 2 also comprises an encoder 6 coupled to an input of the driver 8, for controlling the light source 10 to be driven via the driver 8. Particularly, the encoder 6 is configured to control the light source 10, via the diver 8, to modulate the illumination it emits in order to embed a cyclically repeated coded light message.

The message may be embedded by modulating any suitable property of the light, typically its intensity. Any suitable known modulation scheme may be used to do this. In some simple schemes the signal embedded into the light may simply take the form of a single periodic waveform (e.g. sinusoid or square wave) with a characteristic modulation frequency that is unique to the light source 10 (or at least unique within the system in question). This way the frequency of the modulation can serve as an identifier (ID) of the light source to distinguish it amongst others in the system. In more complex schemes symbols of data may be embedded into the light in order to encode any arbitrary data signal. The symbols of data are typically modulated according to a baseband modulation relative to the frequency of the EM radiation itself, i.e. a low frequency compared to the fundamental carrier. This can be done by directly modulating data symbols into the amplitude or intensity of the light, e.g. by amplitude shift keying, or pulse position modulation. Alternatively some schemes modulate an artificial carrier waveform into the light (still at low frequency compared to the EM frequency of the light itself) and then modulating a property of this carrier such as its frequency or phase, i.e. using frequency shift keying or phase shift keying.

Manchester coding is an example of a DC free code for embedding data into light. Ternary Manchester is $DC^2$ free, meaning not only does the power spectral density go to zero at zero Hertz, but the gradient of the power spectral density also goes to zero, thus eliminating visible flicker even further. For higher speeds, Pulse amplitude Modulation (PAM) and variants of multi-carrier modulation, in particular Orthogonal Frequency Division Multiplexing (OFDM) modulation are popular modulation methods. OFDM data also does not contain a DC term and only contains real (non-imaginary) signals.

In embodiments the encoder 6 is implemented in the form of software stored on a memory of the transmitter 2 and arranged for execution on a processing apparatus of the transmitter (the memory on which the software is stored comprising one or more memory units employing one or more storage media, e.g. EEPROM or a magnetic drive, and the processing apparatus on which the software is run comprising one or more processing units). Alternatively it is not excluded that some or all of the encoder 6 could be implemented in dedicated hardware circuitry, or configurable or reconfigurable hardware circuitry such as a PGA or FPGA.

The receiver 4 comprises a plurality of cameras 12 and a coded light decoder 14 coupled to an input from the cameras 12 in order to receive images captured by the camera 12. Two cameras 12i, 12ii are shown for illustrative purposes, but more than two may also be used. The different cameras 12i, 12ii are arranged with substantially the same or at least overlapping fields of view, to capture at least part of the same light source 10 within their respective fields of view and therefore frame area. In embodiments some or all of the multiple cameras 12i, 12ii may be arranged side-by-side (adjacent one another), and/or may be arranged with their optical axes (viewing direction) aligned in parallel so as to have substantially the same field of view. And/or, in embodiments some or all of the multiple cameras 12i, 12ii may be housed in the same device, such as a mobile user terminal (e.g. smartphone or tablet) or a dedicated camera device. For instance, in a suitable example with all of these properties, some or all of the multiple cameras 12i, 12ii may be the individual cameras of a stereoscopic or plenoptic camera device. Alternatively however, in other alternative or additional arrangements, some or all of the multiple cameras 12i, 12ii may be arranged to point in different directions and/or may be placed at different positions (but still capturing the same light source 10), and/or may be housed in different devices.

In embodiments, the decoder 14 is implemented in the form of software stored on a memory of the receiver 4 and arranged for execution on a processing apparatus of the receiver 4 (the memory on which the software is stored comprising one or more memory units employing one or more storage media, e.g. EEPROM or a magnetic drive, and the processing apparatus on which the software is run comprising one or more processing units). Alternatively it is not excluded that some or all of the decoder 14 could be implemented in dedicated hardware circuitry, or configurable or reconfigurable hardware circuitry such as a PGA or FPGA.

The encoder 6 is configured to perform the transmit-side operations in accordance with embodiments disclosed herein, and the decoder 14 is configured to perform the receive-side operations in accordance with the disclosure herein. Note also that the encoder 6 need not necessarily be implemented in the same physical unit as the light source 10 and its driver 8. In embodiments the encoder 6 may be embedded in a luminaire along with the driver and light source. Alternatively the encoder 6 could be implemented externally to the luminaire 4, e.g. on a server or control unit connected to the luminaire 4 via any one or more suitable networks (e.g. via the internet, or via a local wireless network such as a Wi-Fi or ZigBee, 6LowPAN or Bluetooth network, or via a local wired network such as an Ethernet or DMX network). In the case of an external encoder, some hardware and/or software may still be provided on board the luminaire 4 to help provide a regularly timed signal and thereby prevent jitter, quality of service issues, etc.

Similarly the coded light decoder 14 is not necessarily implemented in the same physical unit as the cameras 12. In embodiments the decoder 14 may be incorporated into the same unit as one or both (or all) of the cameras 12i, 12ii, e.g. incorporated together into a mobile user terminal such as a smartphone, tablet, smartwatch or pair of smart-glasses (for instance being implemented in the form of an application or "app" installed on the user terminal). For instance the cameras 12i, 12ii may be a pair of stereoscopic cameras integrated into the mobile user terminal, originally intended for capturing 3D images. Alternatively however, the decoder 14 could be implemented on an external terminal. For instance the cameras 12 may be implemented in one or more first user devices such as a dedicated camera unit or units, or a mobile user terminal like a smartphone, tablet, smartwatch or pair of smart glasses; whilst the decoder 14 may be implemented on a second terminal such as a laptop, desktop computer or server connected to the cameras 12 on the first devices(s) via any suitable connection or network, e.g. a one-to-one connection such as a serial cable or USB cable, or via any one or more wide-area networks such as the Internet or a mobile cellular network, or a local wireless network like a Wi-Fi or Bluetooth network, or a local wired network like an Ethernet or DMX network.

Figure 3:
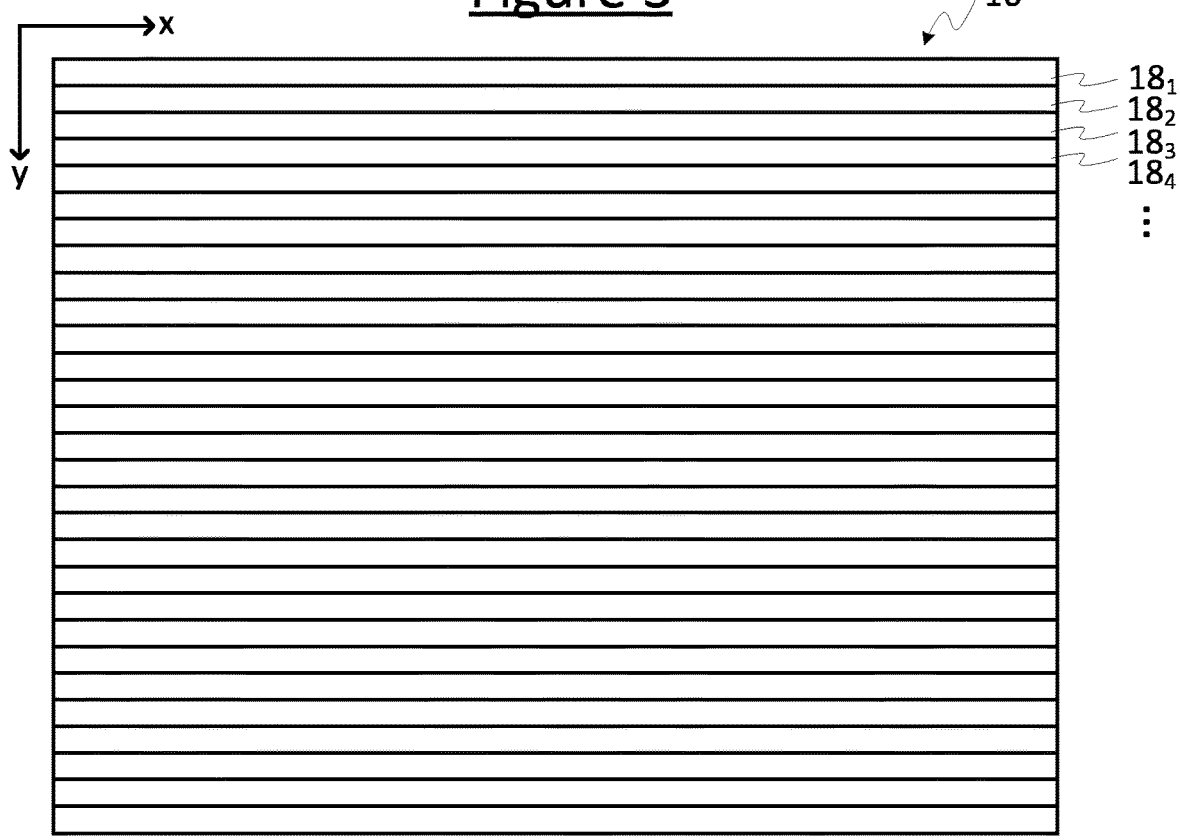

FIG. 3 represents the image capture element 16 of one of the cameras 12, which takes the form of a rolling-shutter camera. Each camera 12 may be configured in a similar manner. The image capture element 16 comprises an array of pixels for capturing signals representative of light incident on each pixel, e.g. typically a square or rectangular array of square or rectangular pixels. In a rolling-shutter camera, the pixels are arranged into a plurality of lines in the form of horizontal rows 18. To capture a frame each line is exposed in sequence, each for a successive instance of the camera's exposure time T exp. In this case the exposure time is the duration of the exposure of an individual line. Note of course that in the context of a digital camera, the terminology "expose" or "exposure" does not refer to a mechanical shuttering or such like (from which the terminology historically originated), but rather the time when the line is actively being used to capture or sample the light from the environment. Note also that a sequence in the present disclosure means a temporal sequence, i.e. so the exposure of each line starts at a slightly different time. This does not exclude that optionally the exposure of the lines may overlap in time, i.e. so the exposure time T exp is longer than the line time (1/line rate), and indeed typically this is more often the case. For example first the top row $18_1$ begins to be exposed for duration T exp, then at a slightly later time the second row down $18_2$ begins to be exposed for T exp, then at a slightly later time again the third row down $18_3$ begins to be exposed for T exp, and so forth until the bottom row has been exposed. This process is then repeated in order to expose a sequence of frames.

Figure 5:
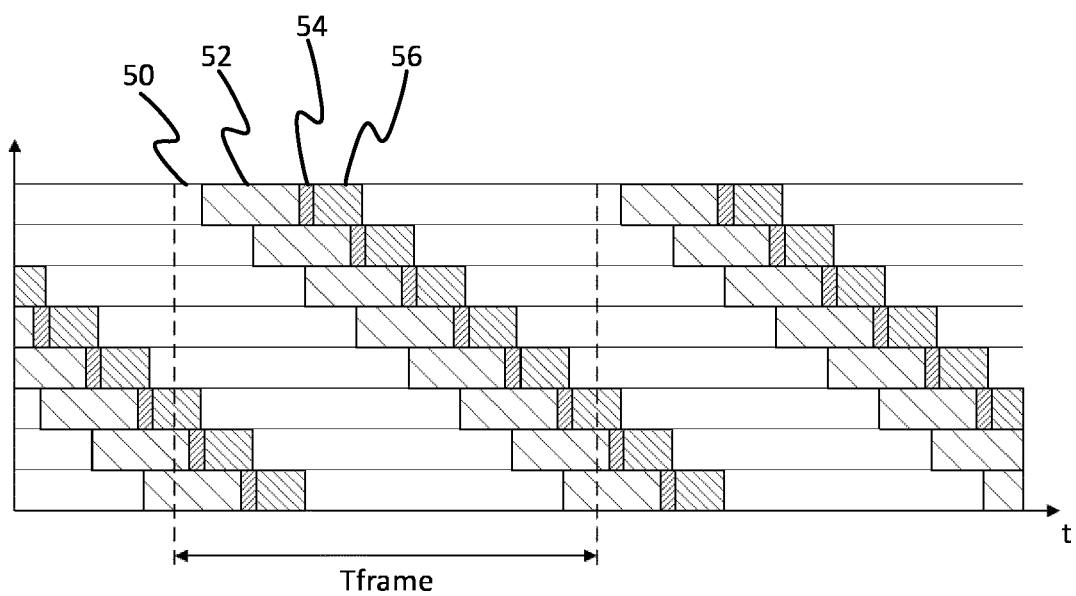
FIG. 5 is a timing diagram showing the line readout of a rolling shutter camera.

An example of this is illustrated in FIG. 5, where the vertical axis represents different lines 18 of the rolling-shutter image capture element, and the horizontal axis represents time (t). For each line, reference numeral 50 labels the reset time, reference numeral 52 labels the exposure time T exp, reference numeral 54 labels the readout time, and reference numeral 56 labels the charge transfer time. Tframe is the frame period, i.e. 1/framerate.

Coded light can be detected using a conventional video camera of this type. The signal detection exploits the rolling shutter image capture, which causes temporal light modulations to translate to spatial intensity variations over successive image rows.

Figure 4:
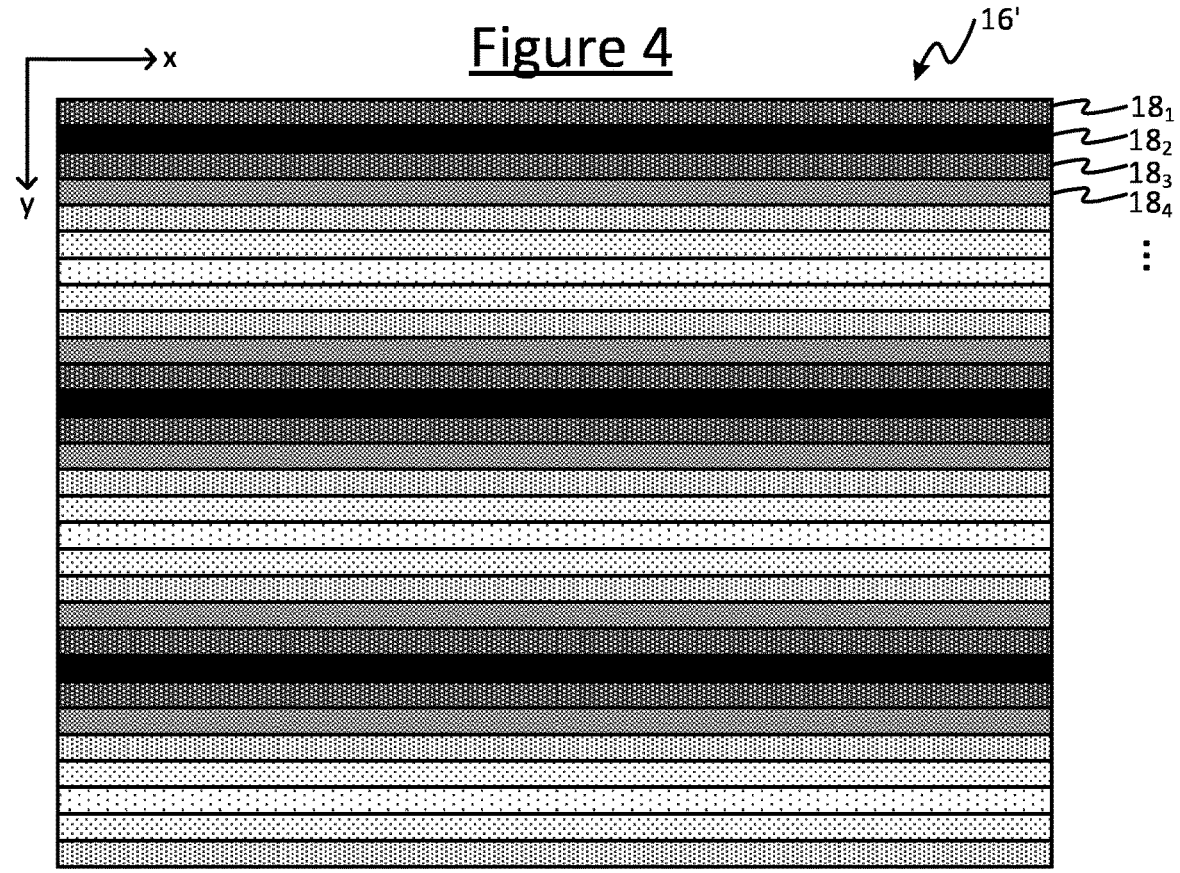

This is illustrated schematically FIG. 4. As each successive line 18 is exposed, it is exposed at a slightly different time and therefore (if the line rate is high enough compared to the modulation frequency) at a slightly different phase of the modulation. Thus each line 18 is exposed to a respective instantaneous level of the modulated light. This results in a pattern of stripes which undulates or cycles with the modulation over a given frame. Based on this principle, the image analysis module 14 is able to detect coded light components modulated into light received by the camera 10.

For coded light detection, a camera 12 with a rolling-shutter image sensor has an advantage over global-shutter readout (where a whole frame is exposed at once) in that the different time instances of consecutive sensor lines causes fast light modulations to translate to spatial patterns as discussed in relation to FIG. 4. However unlike shown in FIG. 4, the light (or at least the useable light) from a given light source 4 does not necessarily cover the area of the whole image capture element 16, but rather only a certain footprint. As a consequence, the shorter the vertical spread of a captured light footprint, the longer the duration over which the coded light signal is detectable. In practice, this means only a temporal fragment of the entire coded light signal can be captured within a single frame, such that multiple frames are required in order to capture sufficient shifted signal fragments to recover the data embedded in the coded light. The smaller the signal fragment in each frame, the more captured frames are necessary before data recovery is possible.

Figure 2:
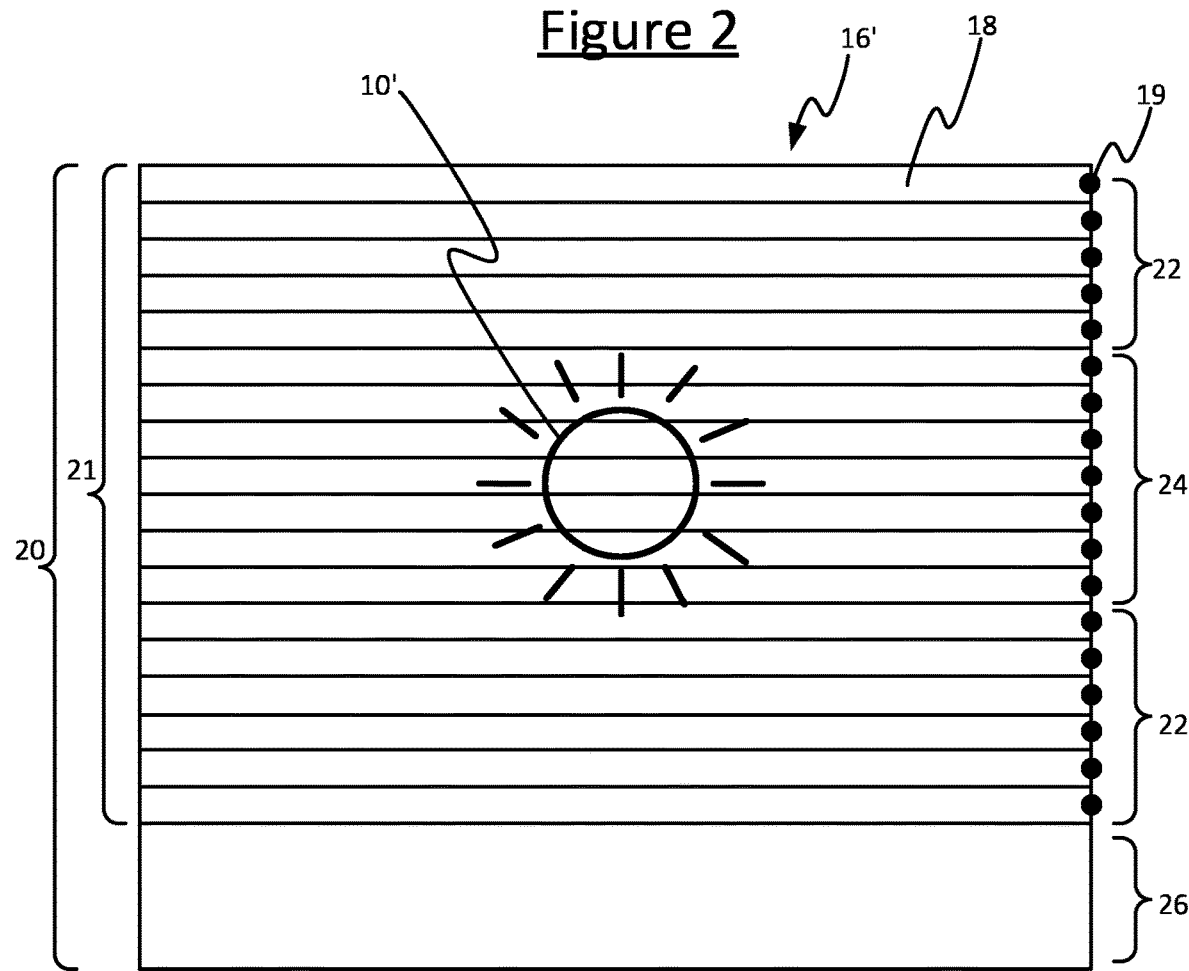
FIG. 2 is a schematic representation of a frame captured by a rolling shutter camera, FIG. 3 schematically illustrates an image capture element of a rolling-shutter camera, FIG. 4 schematically illustrates the capture of modulated light by rolling shutter.

Referring to FIG. 2, each camera 12 is arranged to capture a respective series of frames 16', which if the camera is pointed towards the light source 10 will contain an image 10' of light from the light source 10. The projection 10' of the image of the light source 10 onto the image plane (i.e. frame area) may be referred to as the footprint of the light source. As discussed, the camera 12 is a rolling shutter camera, which means it captures each frame 16' not all at once (as in a global shutter camera), but by line-by-line in a sequence of lines 18. That is, each frame 16' is divided into a plurality of lines 18 (the total number of lines being labelled 20 in FIG. 2), each spanning across the frame 16' and being one or more pixels thick (e.g. spanning the width of the frame 16' and being one or more pixels high in the case of horizontal lines). The capture process begins by exposing one line 18, then the next (typically an adjacent line), then the next, and so forth. For example the capturing process may roll top-to-bottom of the frame 16', starting by exposing the top line, then next line from top, then the next line down, and so forth. Alternatively it could roll bottom-to-top, or even side to side. Of course if the camera 12 is included in a mobile or movable device such that it can be oriented in different directions, the orientation of the lines relative to an external frame of reference is variable. Hence as a matter or terminology, the direction perpendicular to the lines in the plane of the frame (i.e. the rolling direction, also referred to as the line readout direction) will be referred to as the vertical direction; whilst the direction parallel to the lines in the plane of the frame 16' will be referred to as the horizontal direction.

To capture a sample for the purpose of detecting coded light, some or all of the individual pixels samples of each given line 18 are combined into a respective combined sample 19 for that line (e.g. only the "active" pixels that usefully contribute to the coded light signal are combined, whilst the rest of the pixels from that line are discarded). For instance the combination may be performed by integrating or averaging the pixel values, or by any other combination technique. Alternatively a certain pixel could be taken as representative of each line. Either way, the samples from each line thus form a temporal signal sampling the coded light signal at different moments in time, thus enabling the coded light signal to be detected and decoded from the sampled signal by the decoder 14.

Figure 6:
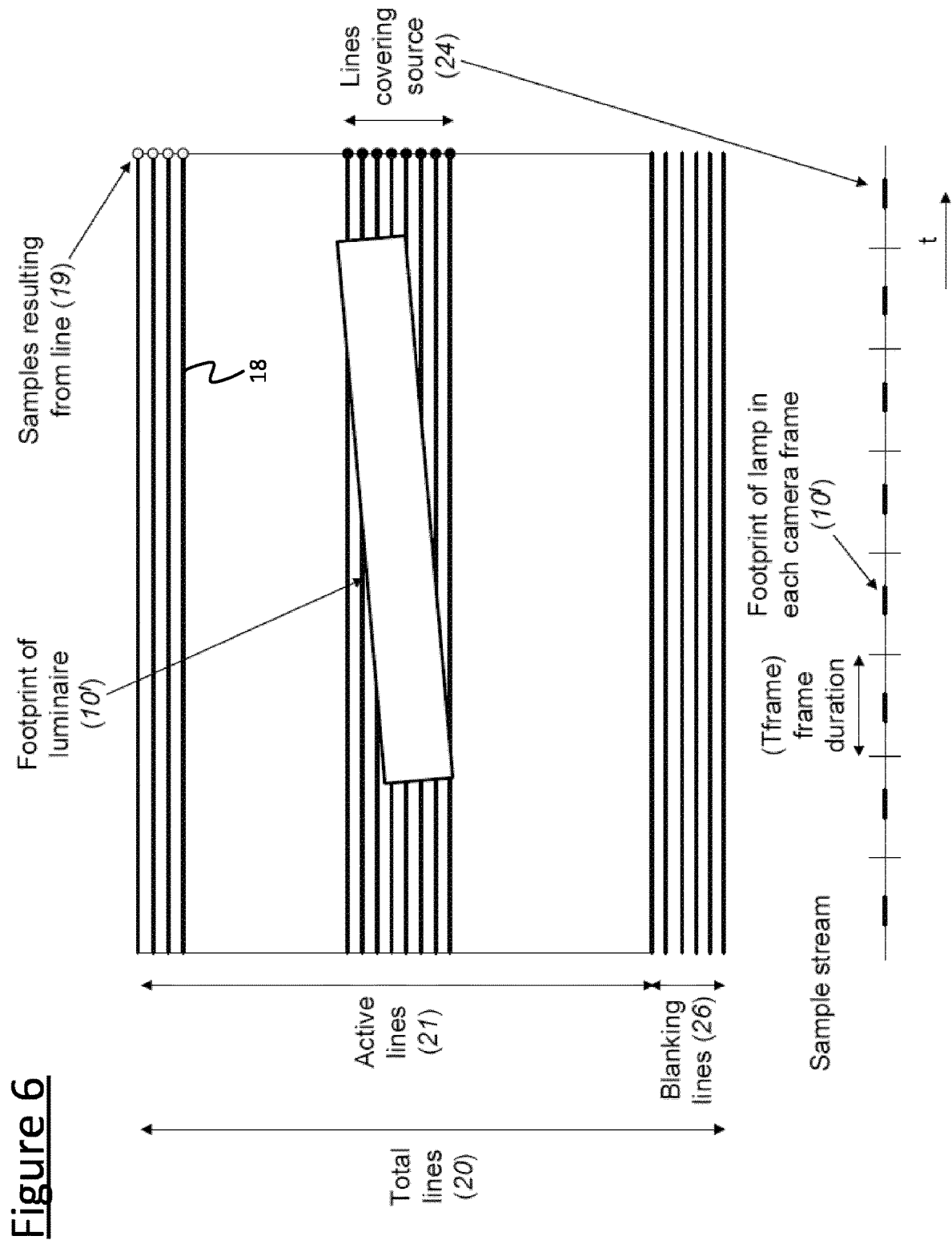
FIG. 6 is a schematic illustration of the footprint of a luminaire in a captured image.

For completeness, note that the frame 16' may also include some blanking lines 26 (illustrated in FIG. 6). Typically the line rate is somewhat higher than strictly needed for all active lines: the actual number of lines of the image sensor). The clock scheme of an image sensor uses the pixel clock as the highest frequency, and framerate and line rate are derived from that. This typically gives some horizontal blanking every line, and some vertical blanking every frame. The lines 'captured' in that time are called blanking lines and do not contain data.

Note also, as well as dedicated rolling-shutter cameras, there also exist CMOS imagers that support both rolling shutter and global shutter modes. E.g. these sensors are also used in some 3D range cameras, such as may soon be incorporated in some mobile devices. The term "rolling-shutter camera" as used herein refers to any camera having rolling shutter capability, and does not necessarily limit to a camera that can only perform rolling-shutter capture.

A challenge with coded light detection is that the footprint 10' of the light source 10 does not necessarily cover all or even almost all of every frame 16'. Moreover the light being emitted is not necessarily synchronized with the capturing process which can result in further problems.

A particular problem in using a rolling shutter camera 12 for coded light detection therefore arises, because the light source 10 serving as a coded light transmitter may in fact cover only a fraction of the lines 18 of each frame 16'. Actually, only the lines 24 in FIG. 2 contain pixels that record the intensity variations of the coded light source and thus lead to samples containing useful information. All the remaining "lines per frame" 22 and their derived samples do not contain coded light information related to the source 10 of interest. If the source 10 is small, one may only obtain a short temporal view of the coded light source 10 in each frame 16' and therefore the existing techniques only allow for very short messages. However, it may be desirable to have the possibility of also transmitting longer messages.

Accordingly, techniques are known whereby the coded light message is repeated cyclically, and the decoder 14 at the receive side 4 is able to reconstruct or "stitch together" the individual fragments of the message seen over different frames. Such techniques are known in the art.

However, as will be elaborated upon in more detail shortly, certain combinations of frame rate and message period (1/message repetition rate) result in the same fragments being seen over and over again, whilst other fragments are never seen or at least take a very long time to roll into view.

As mentioned, a VLC transmitter 2 suited for smartphone detection, or the like, typically transmits repeated instances of the same message because only a part of the camera image 16' is covered by the light source 10 when viewed by the camera 12 from a typical distance (e.g. a few meters). Therefore only a fraction of the message is received per image (i.e. per frame 16') and the detector 14 needs to collect the data from multiple frames. Here is where some problems may occur. Firstly, when the number of lines 24 covered by the light source 10 is small then it may take many frames to collect a message. Secondly, the detector needs to collect different parts of the message in order to fully receive the complete message. The message repetition rate is fixed and determined by the luminaire or transmitter 4 (e.g. acting as a beacon). The framerate of the camera 12 is typically also fixed, or at least is not a parameter that can be selected in its own right. However, the combination can lead to a so called non-rolling message. This means that the message rate and frame rate have such a ratio that some parts of the message are never 'seen' by the camera 12 (or equivalently the frame period and message repetition period have such a ratio that some parts of the message are never seen by the camera 12).

FIG. 6 shows a typical image of a light source 10 as seen by a rolling-shutter camera 12. The rolling shutter camera 12 samples every line 18 with a slight delay (1/the line rate) relative to the previously sampled line in the sequence, the sampling of the lines 18 typically rolling in sequence top-to-bottom or bottom-to-top. This means the temporal light variation of the coded light can be captured spatially (in the vertical direction). The lines labelled 18 in FIG. 6 indicate the camera lines, all lines are scanned during one frame time Tframe (=1/framerate). The rectangle illustrates a typical footprint 10' of a light source 10. For coded light detection, the pixel values on one line are typically condensed into a sample per line, e.g. after pixel selection and averaging, as indicated schematically by the dots 19 at the right side (though in embodiments the 2D image may also still be used for purposes related to the detection, such as region segmentation and/or motion estimation). The lines that capture the light source 10 are labelled 24. The scanning of these lines lasts for a duration Tsource (<Tframe). The cyclically repeated message has an overall message repetition period (1/the message repetition rate) of Tmessage.

At the bottom of FIG. 6, the 1D sample stream as a function of time is shown. As also illustrated, only some of the samples per frame corresponding to the footprint 10', where:

footprint ratio α=Tsource/Tframe

Typically, if there is no particular rational ratio between the frame rate and the message repetition rate, then each frame 16' (while scanning the footprint 10' of the source 10) will capture a different partial view of the message that is cyclically transmitted by the source 10. By combining the footprints of sufficiently many consecutive frames (a process sometimes referred to as "stitching"), then the detector 14 is able to reconstruct the complete message, provided that Tframe, α and the message duration satisfy certain properties as described further below. The number of frames (Nf) needed for stitching or reconstructing a complete message, is the main parameter which determines the decoding delay, i.e., the waiting time before a decoding result is available to the system.

As an intuitive example, consider the case where the frame period is an integer multiple of the message repetition period, e.g. equal to the message period (1×the message period). In the first frame to be captured, the scanning of the lines 24 covering the source 10 happens to coincide in time with a certain first fragment of the coded light message being emitted by the source—whatever portion of the message happens to be being transmitted at the time those particular lines 24 are being scanned. Then in the next frame to be captured, the same lines 24 will be scanned again at a time Tframe later. If the next instance of the message is also repeated after a time Tmessage=Tframe (or ½Tframe, (⅓) Tframe etc.), then the lines 24 covering the footprint 10' come to be scanned again, the same fragment of the message will have come around (assuming the footprint 10' has not moved relative to the frame area 16'). Thus the camera 12 will always see the same fragment of the message and always miss the rest of the message. On the other hand, say the message repetition period Tmessage is some arbitrary ratio of the frame period Tframe, e.g. Tmessage=(1/√2) Tframe. In this case, when the lines 24 covering the footprint 10' come to be scanned again after a frame period Tframe, the message will have rolled around by some amount that is out of phase with the frame period. Hence that frame will see a different fragment of the message. As long as certain other relationships between frame period and message period do not occur (some combinations result in "switching" whereby alternate frames repetitively see alternate fragments but other fragments are repeatedly missed), then the third successive frame will see yet another different fragment of the message, and so forth. According to the terminology sometimes used in the art, this phenomenon is described by saying that the message is "rolling" with respect to the frame rate or frame period, or by saying that the "rolling condition" is met.

Figure 7:
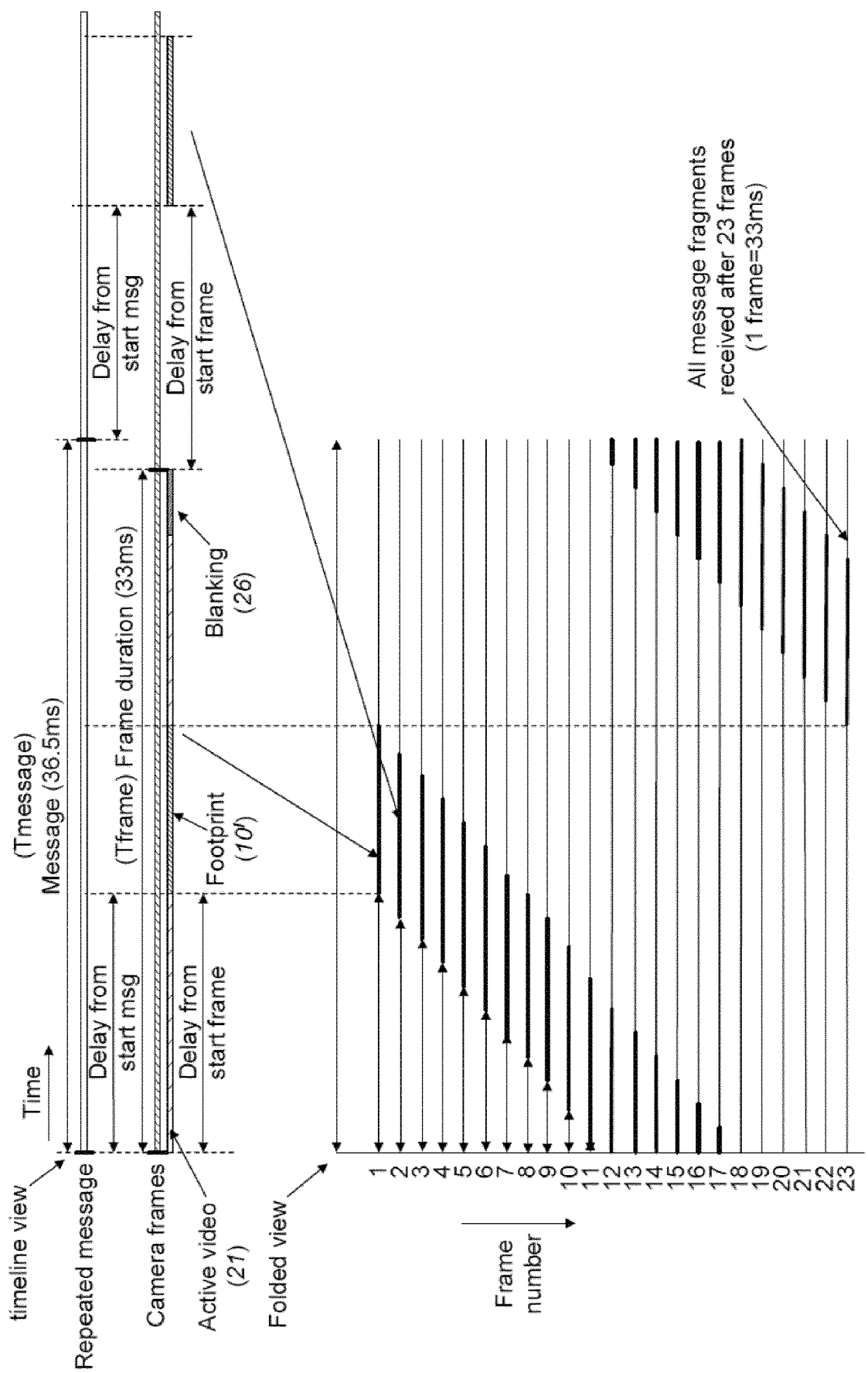
FIG. 7 is a timing diagram illustrating message reconstruction from multiple fragments.

Another example is shown in FIG. 7. In this example the message period Tmessage is 36.5 ms and the frame period Tframe is 33 ms. The footprint ratio α=0.25. The message is continuously repeated and the camera 12 is capturing the footprint 10' of the light source 10. Because the message period Tmessage differs from the frame period Tframe, the message appears to roll over the camera screen: at every frame a shifted part of the message is captured. In this example it would take 23 frames to get a complete message (23*33 ms=760 ms). There is quite some overlap in this example: meaning that parts of the message are captured more than once.

On the other hand, when the message period Tmessage is more-or-less the same as the frame period Tframe then the message is effectively not 'rolling'. This means that the camera 'sees' (in the footprint area 10') the same fraction of the message in every frame. Especially when the footprint 10' is small then it can take a lot of frames to collect all the fractions needed to gather up a complete copy of the transmitted message. This effect happens also for other ratios of the message and frame period, such as "switching" combinations where one frame captures a first fragment of the message, then the next frame captures a second fragment of the message, but then the next frame after that captures the first fragment again, and so forth, such that parts of the message not covered by the first and second fragments are still never captured.

In general, if $1/(n+1) < \alpha \leq 1/n$, where n is an integer, then one encounters "non-rolling" footprints if:

$$\frac{T_{message}}{T_{frame}} \in \left\{ \frac{k}{m} \,\middle|\, m = 1, K, n, k \in N^+ \right\}$$

where $N^+$ is the set of all positive integers. Also, if the relationship is close to such a node, the message will roll or "drift" only very slowly with respect to the frame period, and so it will take a very long time to capture enough different fragments to reconstruct a message.

Figure 8:
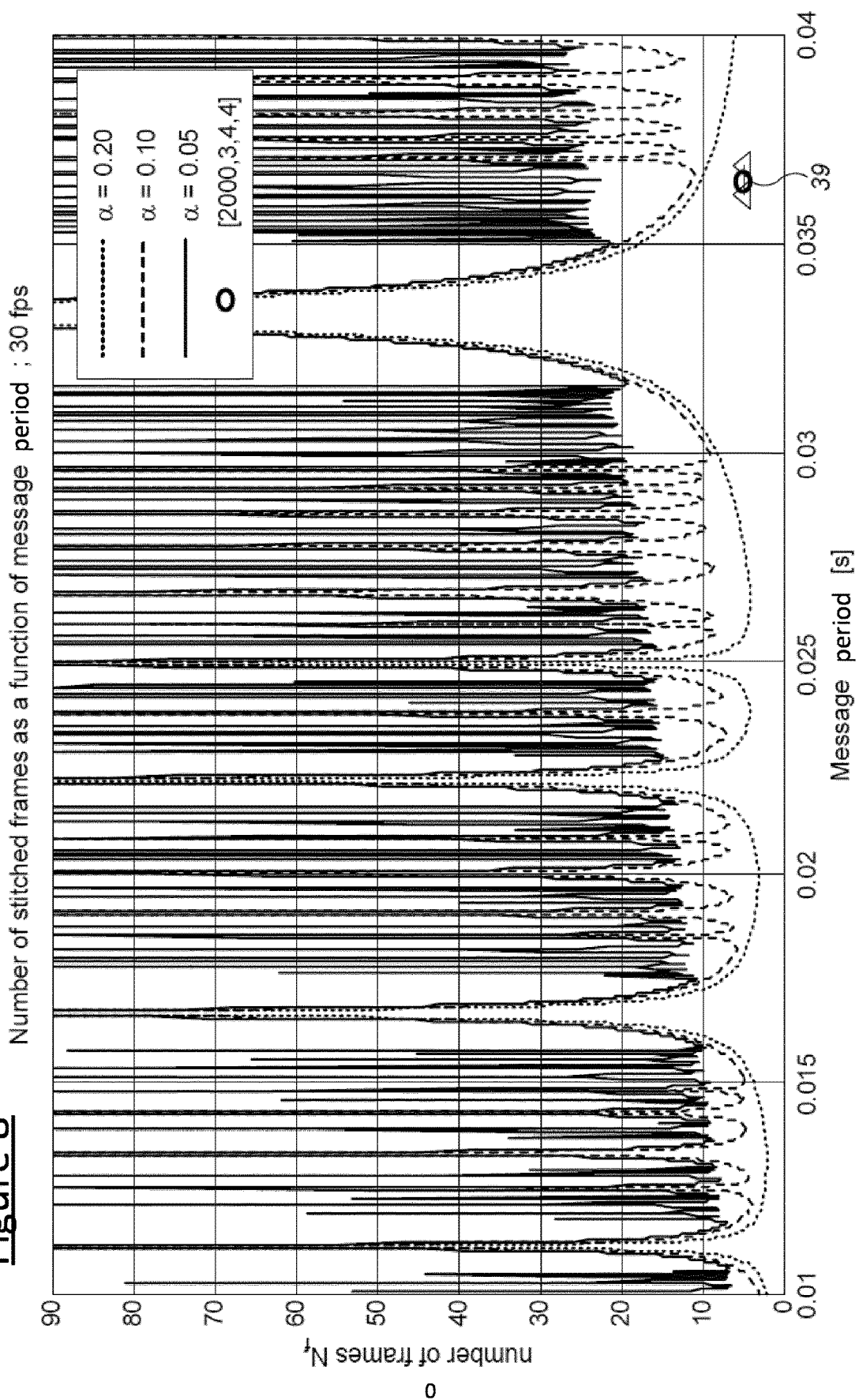
FIG. 8 is a plot of number of frames needed to capture a message vs. message duration.

FIG. 8 shows some example plots of Nf as function of the message period Tmessage for a 30 fps camera, where Nf is the number of frames required to capture enough fragments to make up a compete message. The line with the fewest asymptotes indicates the number of frames needed to collect a message with a light source footprint ratio ($\alpha$) of 0.2. The line with the second greatest number of asymptotes is for a footprint ratio $\alpha=0.1$. The line with the most asymptotes is for a small footprint of $\alpha=0.05$. For the larger footprint $\alpha=0.2$ there are a few asymptotes, with a very wide one close to the frame period, but a lot of message periods would result in acceptable number of stitching frames. For the smaller footprints there will occur a lot of narrower asymptotes (with infinite detection times) that require careful selection of the message period.

In some systems the message period may be pre-designed for use with cameras 12 having a certain frame rate, such that for a minimum required footprint 10', the number of frames for detection is acceptable (i.e. to avoid the asymptotes). The small black circle labelled 39 in the right bottom area of FIG. 8 indicates an example of such a working point for the message duration (36.5 ms). However, problems with detection may nonetheless occur when the clock of the driver 8 at the transmit side 2 is drifting a bit, or if the footprint 10' is a bit smaller than designed for. In such cases the detection can become difficult, or even not possible at all, because the ratio of message period Tmessage to frame period Tframe becomes closer to one of the asymptotes. Furthermore, in other systems, it is not always possible to design a message period with a particular receiving frame rate in mind, nor vice versa to pre-design a camera designed for a particular message period. In such systems unfortunate coincidental combinations of Tmessage and Tframe may also happen to place their ratio at or close to one of the asymptotes.

In order to avoid such scenarios, then according to the present disclosure, the receiver subsystem 4 is arranged such that the two (or more) cameras 12i, 12ii are configured with different acquisition (i.e. capture) regimes. The cameras 12i, 12ii have at least overlapping fields of view and may have substantially the same field of view (e.g. two adjacent cameras facing in the same direction, as in a stereoscopic arrangement). Each camera 12i, 12ii captures a respective stream of images of the same coded light source 10, preferably with the size, shape and position of the footprint 10' of the light source 10 remaining substantially constant within each given stream over a timescale sufficient to capture enough fragments of the repeating coded light message to capture the whole message (i.e. the footprint 10 is pseudostatic for decoding position). The different streams captured by the different cameras 12i, 12ii capture the same light source 10 at the same time, or at least at overlapping times. However, during this capture, the cameras 12i, 12ii also have a different property which affects the way they capture the message, i.e. different acquisition regimes.

The decoder 14 is configured to exploit the availability of the two (or more) different cameras 12i, 12ii to reduce the time taken to fully capture a coded light message, and/or to improve the reliability of the detection.

According to one aspect disclosed herein, the different acquisition regimes comprise different respective values of a property that affects the number of frames required to acquire enough fragments to reconstruct a complete instance of the message via the respective camera. This property may be frame rate, thus affecting the rolling behaviour of the message relative to the frame period. In other embodiments, the property in question may be physical orientation, i.e. the different cameras 12i, 12ii have different physical orientations relative to one another (e.g. in the plane normal to the coded light direction). This means the different cameras 12i, 12ii capture different footprints 10' of the light source 10 and hence different size fragments of the message (assuming the footprint 10' as projected onto the frame area does not happen to have completely circular symmetry).

Given these different properties, the decoder 14 then selects between the different cameras to use for the message reassembly and decoding, i.e. selects between using the message fragments from only one of the cameras or the other. It does so according to which camera has the property (e.g. frame rate and/or orientation) resulting in the fastest capture of a complete message. So the decoder 14 selects to reassemble and decode the message based specifically on fragments from the camera 12 experiencing the best rolling behaviour, or specifically based on fragments from the camera 12 experiencing the largest vertical footprint.

According to another aspect disclosed herein, the different acquisition regimes comprise different line read-out directions (e.g. up and down). Assuming the footprint 10' does not happen to fall exactly in the centre of the frame, this means the different cameras 12i, 12ii capture the light source 10 at different times and hence different phases of the message, resulting in different fragments of the message. In this case the decoder 14 can combine the fragments from the different cameras 12 in order to reassemble the message more quickly.

In the past VLC, or coded light, detection has been performed using photo diode based receivers. Recently also smartphone cameras are able to be used as receiver for coded light detection. This opens new application areas like personal light control and indoor positioning in which identifiers can be received from luminaires. In this way the lighting infrastructure can be used as a dense beacon network.

In many mobile devices there are already multiple cameras available for taking photos and videos with a front or rear view. It can also be noticed that mobile devices are introduced to the market with 3D imaging capabilities. 3D imaging in general is intended to be used for application such as to focus on the camera on the distance to a certain object, or to measure the size objects in photos, or a 3D reconstruction of a room.

Such 3D imaging is mainly based on stereo vision modules using two cameras or structured light or time-of-flight requiring a dedicated camera. In embodiments disclosed herein, such stereo camera arrangement 12i, 12ii may be exploited for coded light detection. Particularly, the multiple camera arrangement is used to overcome one or both of the shortcomings of rolling shutter VLC detection (small footprint when light source aligned with camera lines, and non-rolling behaviour) by using cameras with different values of the frame rate, physical orientation of the camera, and/or readout direction of the individual sensors. In embodiments one of these may also be subsequently changed to give better rolling behaviour based on the initial results from the two cameras. Thus these differing factors for multiple cameras can be exploited to increase VLC bandwidth and robustness.

One factor that may differ between different rolling-shutter cameras is timing. Hence in a first embodiment, cameras 12i, 12ii with different individual frame rates are used to simultaneously capture respective image streams of the same light source 10. This can be applied for example in case of identical imagers, like used in a stereovision set-up with almost identical field of views, e.g. a stereo vision camera arrangement embedded in a mobile device.

Changing the timing is often not possible with many smartphones (because of API limitations). However, in embodiments, when using different sensors models their individual timing differs by default, and this can be exploited by the decoder 14 to obtain image sequences under different rolling regimes. Alternatively in some cases the frame rate of one or both cameras can be set by the decoder 14, e.g. coded light app, such as via a suitable API (application programming interface) between the application and the camera 12. The frame rate can be set either directly (explicitly setting the desired value of the frame rate), or indirectly (vicariously, by setting a value of some other property such as an exposure value that has a knock-on effect on the value of the frame rate). Either way, the framerate of one or both cameras 12i, 12ii can be set so that the frame rates are different to one another, and that leads to a different timing in terms of rolling behaviour of the message relative to the frame period. Thus the frame rate of the cameras can be deliberately chosen differently to reduce the chance that both experience non-rolling behaviour.

The decoder 14 then selects to use, for decoding, the image stream from the camera with the best rolling behaviour. There are a number of ways this can be determined. One way is for the decoder 14 to monitor for a complete set of fragments covering the whole message duration. WO2015/121155 teaches how to time align message fragments relative to the message period, and once this is done, it is possible to tell whether enough overlapping fragments are available to cover the whole message. The received fragments are time aligned in a stitching buffer of the decoder 14. Once one of the cameras 12i, 12ii has received enough fragments to complete the message, the decoder 14 can use the received fragments from to reassemble the message. Another similar technique is to monitor the degree of overlap between the received, time-aligned fragments in the stitching buffer. I.e. for each camera 12, once the fragments received by that individual camera are time-aligned (as taught for a given camera by WO2015/121155), then it is possible to determine a degree of overlap between fragments (or conversely, the shift or offset in time between fragments from one frame to the next). The camera 12i, 12ii that exhibits too large a degree of overlap (or too small a shift) is rolling slowly relative to the message period. Thus the decoder 14 can then select to continue decoding from the fragments received from the camera with the better rolling behaviour. These methods allow the camera 12 with the best rolling to be determined empirically, i.e. a posteriori, based on observation of the received fragments. Doing so based on the overlap also enables a determination prior to the receipt of a complete message instance from either camera.

In yet further embodiments, the camera 12 with the better rolling can be determined analytically, i.e. a posteriori. Given knowledge of the message repetition period, this can be done based on the relationship shown in FIG. 8 and the associated formula given above. Alternatively this could be done by reference to results from a prior, offline simulation. This allows selection of the best camera 12 prior to the receipt of a complete message instance from either camera, or even before any fragments have been received at all.

In some embodiments, based on the rolling behaviour of one or both cameras, a more optimal frame rate can be determined. The frame rate of one or both of the cameras' sensors can thus be set such that the chance of non-rolling behaviour is minimized or even completely absent. This can be done empirically (a posteriori), by iteratively changing the frame rate of one or both of the cameras 12i, 12ii until a shorter reconstruction time or better degree of overlap between fragments is achieved. By detecting stitching issues the camera(s) 12 can thus be set to another framerate. Or alternatively the optimal frame rate can be computed analytically (a priori) based on the above formula or by reference to the prior simulation.

The analytical approach requires predetermined knowledge of the message period (in terms of number of symbols). The transmitted message length can be known to the decoder 14 via a side channel (e.g. an RF side channel such as Wi-Fi), or can be set as a predetermined parameter per venue. With that, the framerate with the best rolling properties can be calculated. Preferably this also leaves enough headroom to cope with transmitter clock offsets. A second camera 12ii can be set such that the asymptotes of that one are nicely interleaved with the ones of the first camera 12i. Note that the actual transmitter clock is only known in the decoder 14 after clock recovery and then the actual stitching can be done with the buffered fragments. Until then the decoder 14 works with an estimated default transmitter clock and the belonging rolling properties. In embodiments the camera framerate can also be adjusted according to the fragments that are already received, then the fragments that are already stored needs to be adjusted in time with the old timing settings and then they can be combined with the new fragments that use the new timebase. In FIG. 8 one can see examples of a calculated rolling behaviour, corresponding to the number of frames needed to get a complete message.

The analytical approach is not always available, e.g. because the message duration is not pre-known at the receive side, or because the unknown deviation in the transmit clock is too great. On the other hand, the empirical approach, of iteratively searching through multiple different values of frame rate, takes time and requires that the light source 10 remains in the field of-view long enough to capture the complete code after re-adjusting the camera. In practice it takes a camera 12 a few frames to adapt to a new frame rate setting, and so it takes time to scan through multiple different frame rate values.

Another approach therefore is to iteratively change the frame rate of only a first of the cameras 12i to determine the optimal setting for rolling behaviour, while keeping the frame rate for a second of the cameras 12i fixed. With the fixed camera the basic performance is safeguarded, and when the second camera is adjusted in time (assuming light source 10 is still in field of view) then the decoder 14 can switch to using that video stream for detection. I.e. if the message as seen by the first camera 12i is rolling only slowly—but still rolling such that the message will eventually be captured—then the decoder 14 can "hedge its bets" by continuing accumulating message fragments from the second camera 12ii which is experiencing slow-but-reliable rolling behaviour with respect to the message, but at the same time experimenting with multiple different frame rates via the first camera 12i. If enough fragments to cover the whole message are accumulated using the second, constant-framerate camera before the first, varying-framerate camera can do so, then the decoder 14 reassembles and decodes message from the fragments captured by the second camera; but if the decoder finds a frame rate resulting in faster capture of the whole message using the first camera 12*i* (including the time take to scan through the different frame rates), then the decoder 14 instead reassembles and decodes message from the fragments captured by the first camera.

The principle could also be extended to more than two cameras 12, such that one or more cameras are kept at a constant frame rate, and one or more others are used to experiment with different frame rates. In the case of multiple first cameras with varied frame rates, these may each keep the same frame rate as one another at any one time during the search, or more preferably each be varied to explore different frame rates compared to one another (to increase the variety of frame rates that can be searched per unit time). In the case of multiple second cameras with constant frame rates during the search by the first camera(s), these may each keep the same frame rate, or more preferably may each keep a different constant frame rate with respect to one another (to increase the chance that one of them sees the whole message first). If one of the first of second cameras sees the message first, the message may be reassembled and decoded using fragments from only that camera. If more than one of the first cameras sees the whole message before any of the second cameras, then fragments from these first cameras may be combined to reassemble and decode the message; or if more than one of the second cameras sees the whole message before any of the first cameras, then fragments from these second cameras may be combined to reassemble and decode the message.

Further, in some variants, fragments captured by both (i) at least one of the one or more of the first cameras 12*i* at a frame fate or rates resulting from the iterative frame rate scan, and (ii) at least one of the one or more second cameras 12*ii* at their fixed frame rate(s), may be combined together in the stitching, and the message may be decoded based thereon. In such variants of the disclosed techniques, message fragments from both or even all cameras 12 may potentially be combined, rather than selecting between cameras.

In an example implementation the first embodiment uses two identical cameras like in a stereovision set-up embedded in a mobile device. Another variant uses two different cameras, such as when a normal camera and a structured light or time-of-flight sensor are embedded in the mobile device. Note that due to different sensor resolutions and optical systems, in some cases image registration may be needed to be able to relate pixel information between both images. Based on the timing characteristic of each sensor, the frame rate of the cameras can be chosen differently to minimize the chance of non-rolling behaviour.

Another factor that may differ between two cameras 12*i*, 12*ii* is orientation, e.g. actual physical rotation of the unit or device in which the camera is housed, or physical orientation of the camera 12 within the housing or of the sensor element 16 within the camera. Hence in a second embodiment, of the cameras 12*i*, 12*ii* have imagers arranged with a different orientation relative to one another. In embodiments the cameras face in the same direction, i.e. have parallel optical axes and parallel image planes. In embodiments the image sensors are arranged in the same plane. In such cases, ideally the cameras' image sensors are oriented at 90 degrees to one another in the common image plane. This could also be realized by reading out the sensor column-wise instead of row-wise (this functionality is typically not available in mainstream imagers, but is not excluded in all possible implementations). Where the physical orientation of the camera or its sensor element is used, other relative orientations are also possible, as long as the line readout direction of the image sensor of one of the cameras 12*i* contains at least a substantially non-zero component orthogonal to the line readout direction of the image sensor of the other camera 12*ii* (i.e. the line readout directions are not parallel).

Figure 9:
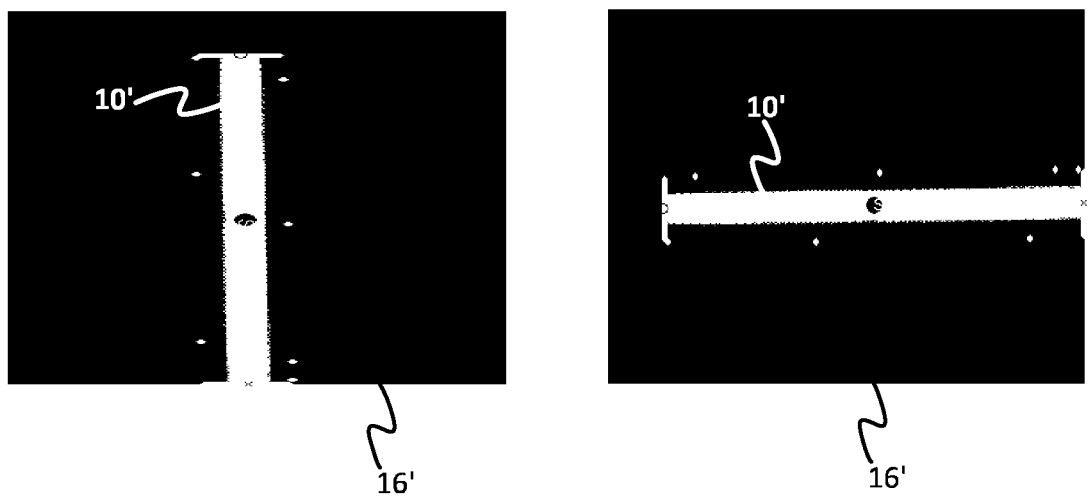
FIG. 9 shows two images of a light source captured using rolling-shutter cameras with two different camera orientations.

The decoder 14 then selects the camera providing the best rolling properties depending to use for VLC decoding, which depends on the relative orientation of the sensor 16 and the light source 10. Referring to the example of FIG. 9, this would be the image with the most vertically oriented light source 10. The more lines are observed on the vertical axis of the sensor (row-direction), the fewer frames are required in order to capture enough overlapping message fragments to cover the whole message. The determination can be performed by analysing how large a footprint 10' of the light source 10 is observed in the row direction of the sensor, and selecting the camera 12 in which the light source 10 is observed to have the largest footprint 10' in the row-direction. The vertical 'size' of the luminaire as seen by the camera 12 (in lines)—i.e. the vertical footprint—has an effect on the detection speed: due to the large overlaps the rolling behaviour is less critical then for small footprints.

In example implementations, the second embodiment may use two similar or different cameras, such as a normal camera and a structured light or time-of-flight sensor embedded in a mobile device.

Figure 10:
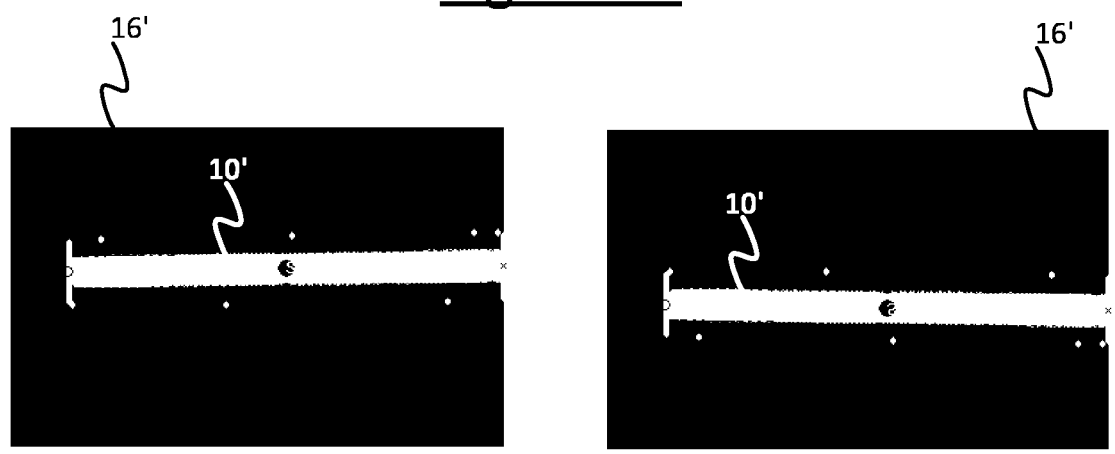
FIG. 10 shows two images of a light source captured using rolling-shutter cameras with two different row readout directions, and FIG. 11 schematically illustrates an effect of row readout direction on message capture.

Yet another factor that may differ between different rolling-shutter cameras is read-out direction. Hence in a third embodiment, the individual read-out directions of the sensors can be set such that the change of non-rolling behaviour is minimized or even absent. By having a different read-out direction of the sensors (e.g. top to bottom vs. bottom to top) their individual timing will also differ. Thus, as long as the light source 10 is not centred in the image, the flipped image will provide additional information. See FIG. 10, which illustrates the two images containing an observed ceiling luminaire.

With rolling shutter sensors the vertical lines are acquired at different moments. When the read-out direction is vertically flipped, the first line in the first image and the last line of the second image are captured at the same moment. When the light source is not in the middle of the field of view of the camera, e.g. more toward the bottom side, then starting the rolling-shutter line scanning at the bottom of the frame results in other sample times of the VLC signal than if scanning from the top down. So by combining these, effectively the footprint (lines covered by the light source) is increased compared to using only a single camera or two synchronized cameras with the same line read-out direction.

Figure 11:
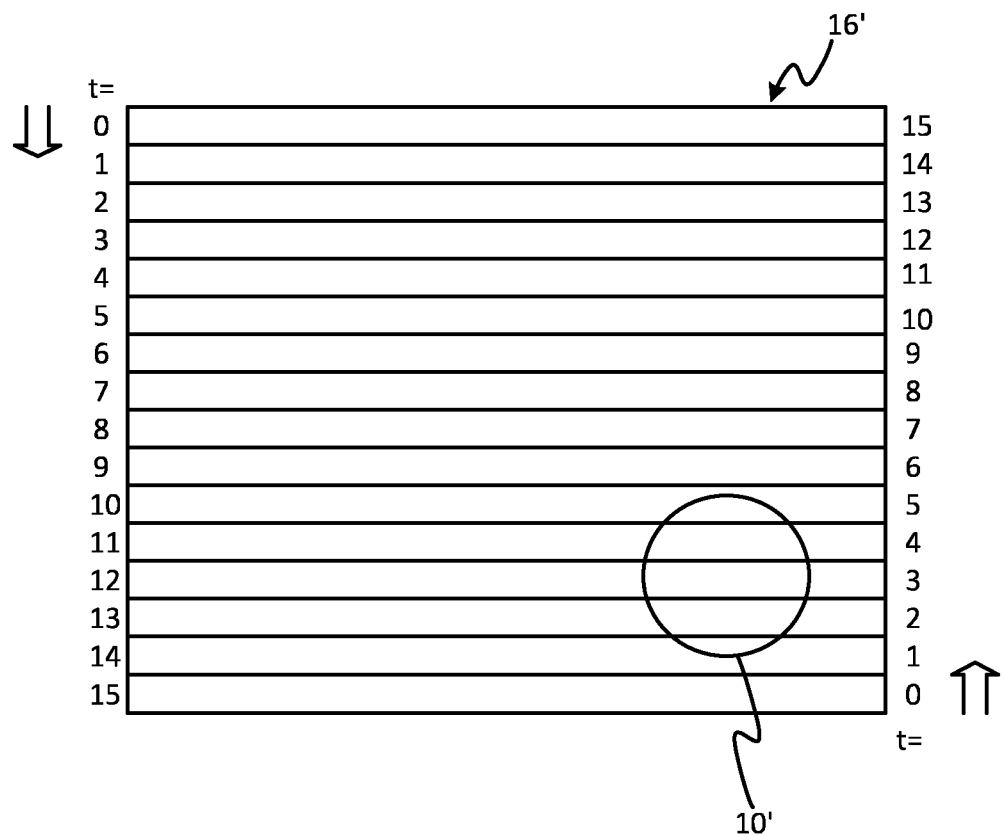
Figure 11:
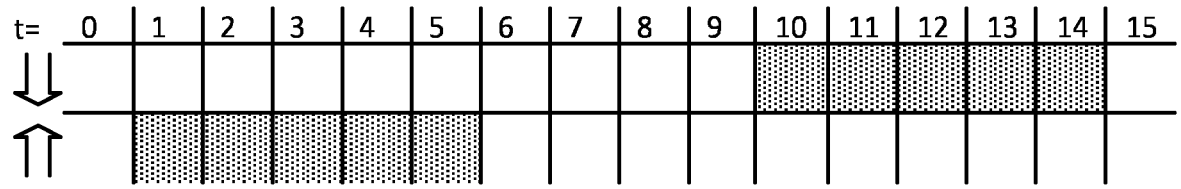

The idea is illustrated schematically in FIG. 11. Consider an example image sensor having sixteen lines read out in at respective sample times t=0 . . . 15 (note that FIG. 11 is simplified for illustrative purposes—most real-life sensors would have a much greater number of lines, and also FIG. 11 ignores factors such as blanking period 26, but the principle is the same). Imagine the footprint 10' of the light source 10 happens, on a given occasion, to cover the second to sixth lines from the bottom of the frame area 16'. If scanning from top to bottom of the frame area 16', the light source 10 is captured at times t=10 to 14. If scanning from bottom to top of the frame area, the light source 10 is captured at times t=1 to 5.

Thus by doing both together, in parallel with different cameras 12, then two different fragments of the message can be captured per frame. Given knowledge of the relative timings of the two opposing rolling-shutter scans of the frame area 16' (in this case top-to-bottom and bottom-to-top), the fragments can be individually aligned in the stitching buffer relative to the message period (N.B. the relative timing may take into account factors such as blanking 26, readout time 54, charge transfer time 56 and reset time 50, not illustrated in FIG. 11). Once sufficient fragments are received and time-aligned they thus enable reassembly of the full message, in fewer frame periods than if only one readout direction was used. The principles of time-aligning and stitching in themselves may be performed for example in accordance with the teachings of WO2015/121155, but based on fragments obtained from the two opposing read-out directions instead of one.

The third embodiment preferably uses two identical cameras like in a stereovision set-up that are embedded in a mobile device. The frame rate of the cameras may also optionally be chosen differently to minimize the chance of non-rolling behaviour, as in the first embodiment. Furthermore, the physical orientation could also be different between the imagers, as in the second embodiment.

Alternatively, in aspects of the invention, the property affecting the number of frames required to capture the whole message, and/or the property affecting a power consumption required to capture the whole message, may for example be exposure time, ISO value, camera resolution, zoom/focus, or region of interest.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of detecting a repeating coded light message embedded in light emitted by a light source, the method comprising:

from each respective one of a plurality of rolling-shutter cameras, receiving a respective series of frames captured by the respective camera, wherein the frames of each series each capture a footprint of the light source, and each frame in the series captures only a portion of the message, and wherein each of the cameras has a different value of a property affecting a number of frames required to capture the whole message;

determining which of the cameras has the value of said property requiring the fewest number of frames to capture the whole message; and based thereon, selecting to decode the message by combining portions of the message captured from the determined camera.

2. The method of claim 1, wherein said property comprises a frame rate at which the respective series is captured.

3. The method of claim 2, comprising varying the frame rate of a first one or more of the cameras to search for a value of the frame rate which reduces the number of frames to capture the message.

4. The method of claim 3, comprising leaving the frame rate of at least a second, other one or more of the cameras constant while varying the frame rate of the one or more first cameras to search for a value that reduces the number of frames required to capture the whole message compared to the constant frame rate or rates of the one or more second cameras.

5. The method of claim 1, wherein said property comprises an orientation of a line readout direction of the rolling-shutter capture, the line readout direction of the cameras being non-parallel with respect to one another.

6. The method claim 1, wherein said determination is performed by observing the time taken to capture the whole message.

7. The method of claim 1, wherein said determination is performed by observing a degree of overlap between fragments prior to receipt of the whole message.

8. The method of claim 1, wherein said determination is performed analytically.

9. The method of claim 1, wherein said cameras comprise at least a pair of cameras; and wherein said property comprises a rolling-shutter line-readout direction; and wherein one of the pair of cameras performs its respective capture with a rolling-shutter line-readout direction in the opposite direction to the other of the pair of cameras.

10. The method of claim 9, wherein the line-readout directions are parallel with one another.

11. The method of claim 1, wherein said cameras comprise at least a pair of cameras housed in a same user device.

12. A computer program product comprising code embodied on computer-readable storage, the code being configured so as when run on one or more processing units to perform operations in accordance with claim 1.

13. Signal processing apparatus comprising a decoder configured to perform operations in accordance with claim 1.

14. A receiver subsystem comprising the apparatus of claim 13 and the cameras.

15. A communication system comprising the receiver subsystem of claim 14 and the light source.

* * * * *